United States Patent [19]

Heinemann et al.

[11] 4,344,783

[45] Aug. 17, 1982

[54] CYCLONE SEPARATOR

[75] Inventors: Otto Heinemann, Ennigerloh; Heinz-Herbert Schmits, Rheda-Wiedenbruck, both of Fed. Rep. of Germany

[73] Assignee: Krupp Polysius AG, Beckum, Fed. Rep. of Germany

[21] Appl. No.: 255,462

[22] Filed: Apr. 20, 1981

[30] Foreign Application Priority Data

May 14, 1980 [DE] Fed. Rep. of Germany ....... 3018519

[51] Int. Cl.[3] ........................ B04C 5/04; B04C 5/081; B01D 45/16

[52] U.S. Cl. ............................... 55/459 B; 55/459 D; 209/144; 210/512.1

[58] Field of Search ..................... 55/204, 418, 459 B, 55/459 C, 459 D; 209/144; 210/512.1

[56] References Cited

U.S. PATENT DOCUMENTS

| | | | |
|---|---|---|---|
| 1,719,447 | 7/1929 | Pfeffer | 55/459 B |
| 3,850,816 | 11/1974 | Koch | 210/512.1 |
| 4,156,485 | 5/1979 | Skardal | 210/512.1 |

FOREIGN PATENT DOCUMENTS

| | | | |
|---|---|---|---|
| 354608 | 8/1931 | United Kingdom | 55/418 |

*Primary Examiner*—David L. Lacey
*Attorney, Agent, or Firm*—Learman & McCulloch

[57] ABSTRACT

A cyclone intended in particular for multistage heat exchangers, the inlet of which communicates with several partial spirals lying one above the other and having different lengths decreasing in the downward direction. A cyclone of this type is distinguished by a considerably reduced overall volume and weight for substantially the same pressure loss and degree of separation.

8 Claims, 4 Drawing Figures

CYCLONE SEPARATOR

BACKGROUND OF THE INVENTION

This invention relates to a cyclone, particularly for multistage heat exchangers, having an externally arranged inlet spiral and a gas pipe which is fed from below and which is bent at substantially a right angle immediately before the inlet spiral.

Multistage cyclone heat exchangers are used for example as preheaters in cement calcining installations. In an effort to reduce the overall height of multistage cylone preheaters of the type in question, attempts have been made to further reduce the overall volume of the cyclones. However, this has given rise to serious separation problems in view of the high dust content of the gases in heat exchangers of this type.

In order to achieve an acceptable degree of separation, the externally situated inlet spiral should extend over a peripheral angle of at least 180°. However, this necessitates a considerable overall volume and weight of the cyclone. Added to this is the fact that, where several cyclone stages are arranged one behind the other, the gas flow undergoes a substantially right-angled deflection before entering the cyclone which leads to separation of the dust in the gas and results in a particularly heavy accumulation of dust in the uppermost part of the inlet spiral.

Now, if a cyclone of the type in question is made very small and if only a very short dip pipe, if any, is installed on account of the high working temperatures, practical experience has shown that hardly any separation-assisting vortex is developed in the cyclone. Instead, the vortex breaks up after only about half a revolution and the gas flows through the outlet opening to the next cyclone stage. In the lower two thirds of the overall height of the cyclone, there is no significant separation of dust through vortex formation.

SUMMARY OF THE INVENTION

The object of the present invention is to obviate the disadvantages mentioned above by constructing a cyclone of the type described in such a way that the overall volume and weight are considerably reduced for substantially the same pressure loss and degree of separation.

According to the invention, this object is achieved by a combination of the following features:

(a) the inlet communicates with each of several partial spirals lying one above the other and spiraling about a common axis;

(b) each partial spiral has a different length which decreases downwards, the uppermost partial spiral extending over a peripheral angle of at least 180° and the lowermost partial spiral extending over a peripheral angle of at least 90°;

(c) all of the partial spirals terminate within the cyclone housing at a substantially uniform radial distance from the axis of the housing.

The invention makes use of the realization that, on the one hand, a longer separation path and a greater centrifugal force are required in the upper region of the inlet spiral on account of the higher dust content present there (through the deflection of the gas stream in the gas pipe), while on the other hand a reduction in the length of the inlet spiral at its lower end provides for a reduction in the diameter of the cyclone housing in this lower region and hence for a considerable reduction in the overall volume of the cyclone. Thus, the necessary height of the cyclone funnel in particular depends upon the diameter of the cyclone housing at the upper rim of the funnel. This housing diameter is made considerably smaller by the subdivision of the inlet spiral in accordance with the invention and the difference in length between the partial spirals.

According to the invention, the inlet preferably opens into at least three partial spirals of preferably equal height. In this connection, experience has shown that the magnitude of the dust deposits on the cresent-shaped bases of the partial spirals depends upon the size of the surface area of those crescent-shaped bases. If the inlet spiral in divided up into several partial spirals, the base areas of the individual partial spirals will be relatively small so that no disturbances can be caused by deposits of dust.

The uppermost partial spiral best extends over a peripheral angle of from 180° to 360° while the lowermost partial spiral extends over a peripheral angle of from 90° to 180° and preferably over a peripheral angle of from 135° to 180°. The partial spirals lying in between are correspondingly graduated in length.

If the cyclone according to the invention is made without a dip pipe (as is advisable particularly in the hottest stages of a multistage heat exchanger), all the partial spirals open or terminate at a substantially uniform radial distance from the axis of the housing which corresponds to the radius of the gas outlet opening of that cyclone. On the other hand, where the cyclone is made with a dip pipe, all the partial spirals terminate as before, which means that the inside diameter of the dip pipe lies radially inwardly of the terminal ends of the partial spirals.

DESCRIPTION OF THE DRAWINGS

Two embodiments of the invention are illustrated in the accompanying drawings, wherein.

Figure 1:
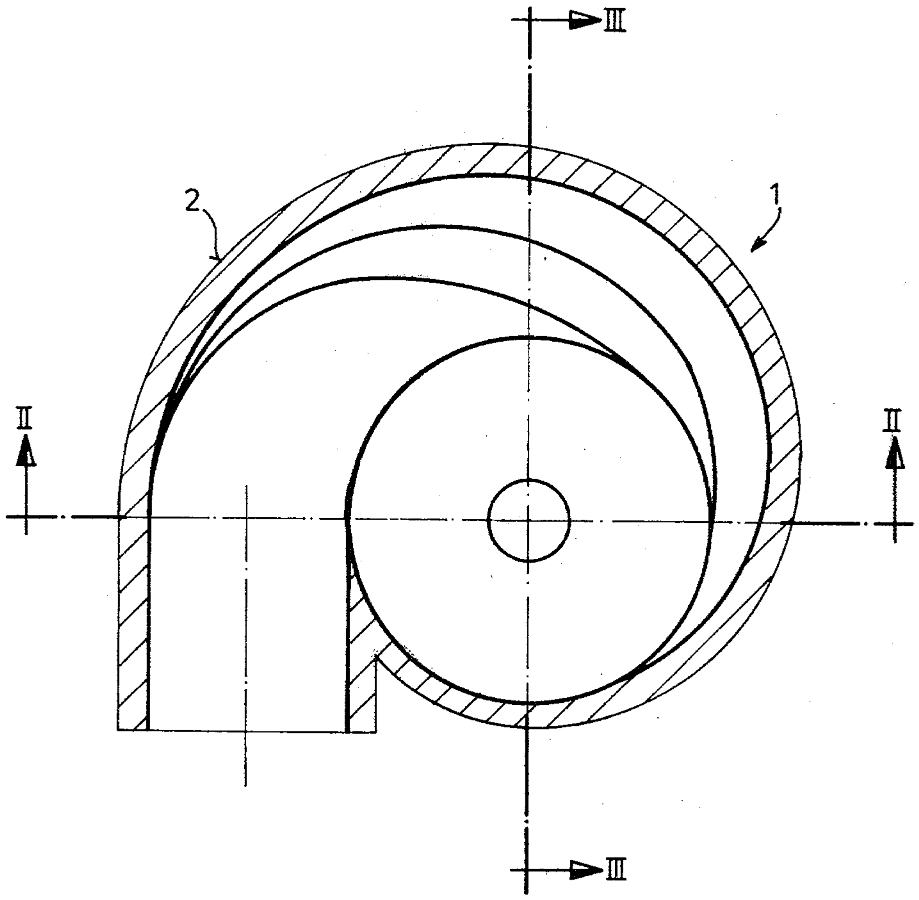
FIG. 1 is a horizontal section (along the line I—I in FIG. 2) through a first embodiment of a cyclone according to the invention.

The cyclone 1 shown in FIGS. 1-3 adjoins a gas feed pipe (not shown) which is supplied from below and which is bent substantially at a right angle to communicate with an inlet 2 which is constituted by three partial spirals 3, 4 and 5 lying one above the other and spiraling about a commmon axis. These three partial spirals 3, 4 and 5 have different lengths decreasing in the downward direction. The uppermost, longest partial spiral 3 extends over a peripheral angle of approximately 270°, the middle partial spiral 4 over a peripheral angle of approximately 180° and the lowermost, shortest partial spiral 5 over a peripheral angle of approximately 135°.

All the partial spirals 3, 4 and 5 terminate at a substantially uniform radial distance from the axis of the housing. The lower end of the housing has a diameter D and the top wall has a circular gas outlet opening 6 having a corresponding diameter D. The axis of the housing passes through the center of the opening 6.

The lowermost partial spiral 5 is adjoined by a material discharge funnel 8 via a relatively short cylindrical connecting element 7.

Figure 2:
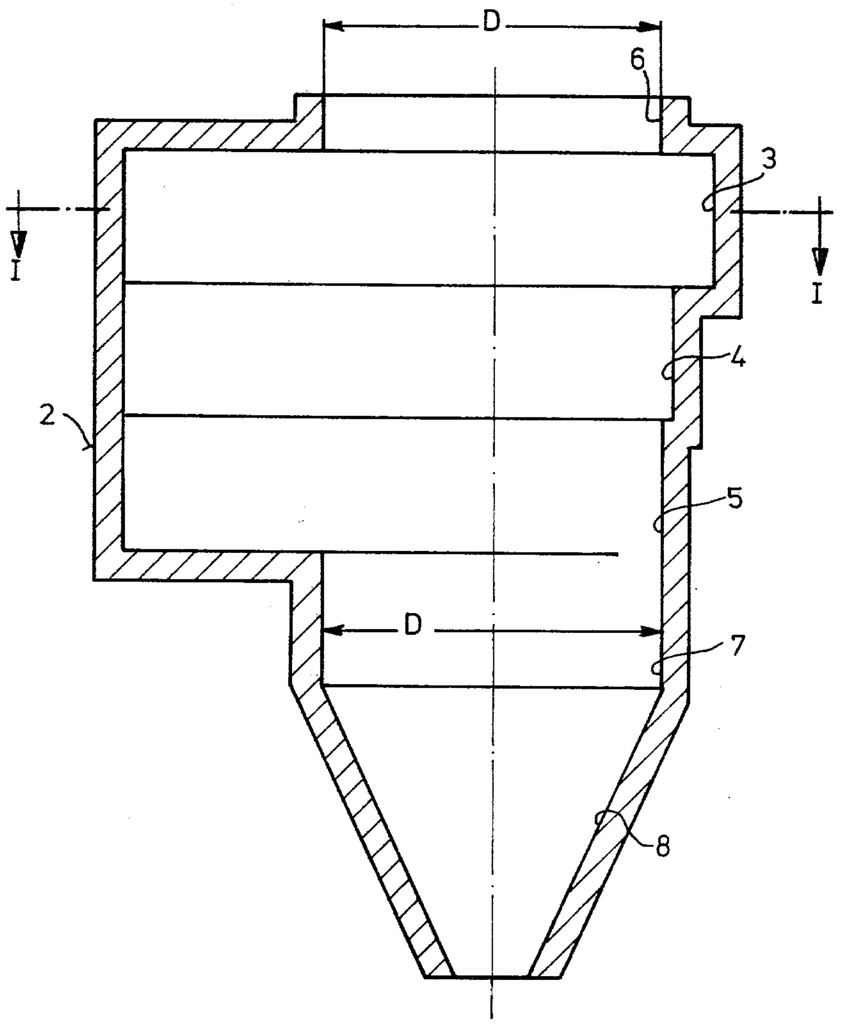
FIG. 2 is a vertical section on the line II—II in FIG. 1.
Figure 3:
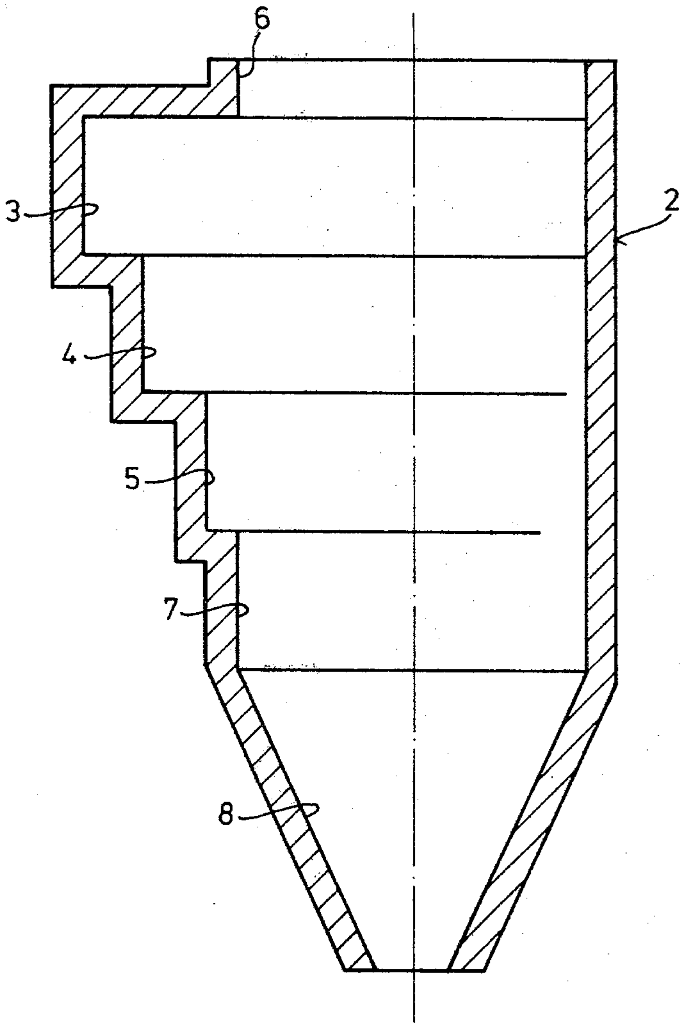
FIG. 3 is a vertical section on the line III—III in FIG. 1.
Figure 4:
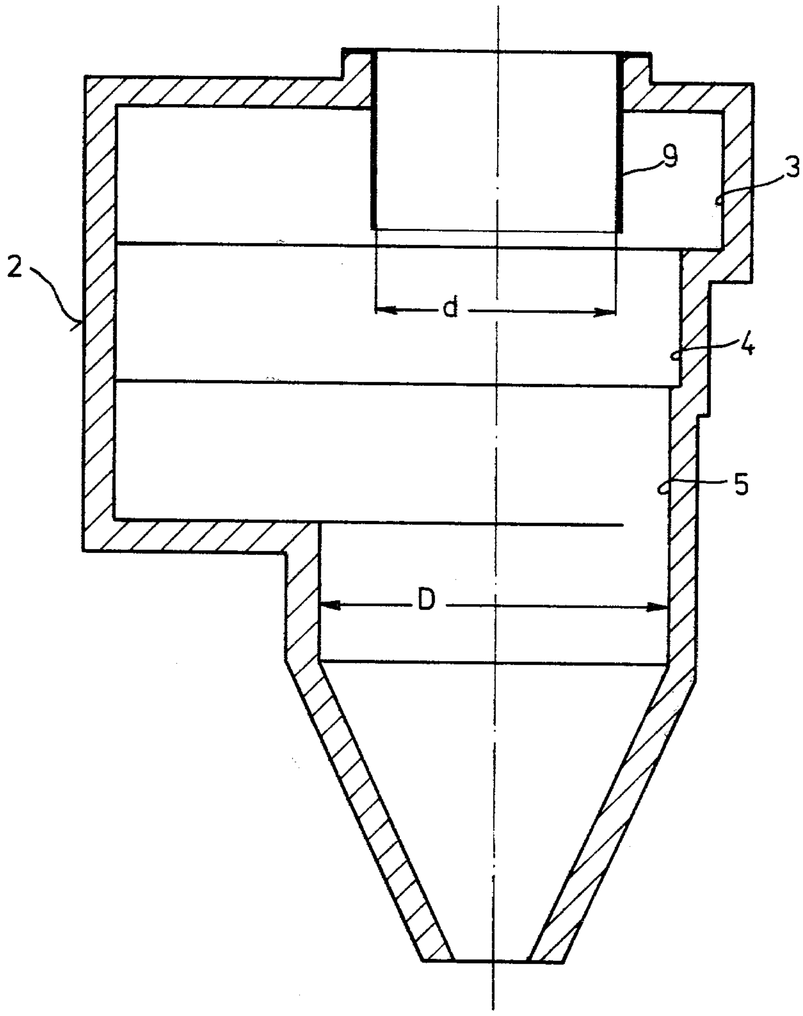
FIG. 4 is a section (corresponding to FIG. 2) through another embodiment of the cyclone according to the invention.

The only difference between the embodiment shown in FIG. 4 and the cyclone shown in FIGS. 1–3 lies in the presence of a dip pipe 9. The inside diameter d of this dip pipe thus is slightly smaller than the diameter D of the cyclone housing.

In the foregoing description, the cyclone axis was assumed to be vertically directed in the interests of simplicity. It is of course also possible in accordance with the invention for the axis of the cyclone to be inclined at any angle. In that case, the expressions used in the description of the inlet spiral ("uppermost" and "lowermost" partial spirals) should be adapted accordingly.

The disclosed embodiment in representative of a presently preferred form of the invention, but is intended to be illustrative rather than definitive thereof. The invention is defined in the claims.

We claim:

1. A cyclone separator comprising a walled housing having at one end an inlet opening and a gas outlet opening, and at its other end a material discharge opening, said inlet opening communicating with each of a plurality of partial spirals spiraling about a common axis and axially spaced from one another in a direction from said one end of said housing toward said other end thereof, each of said partial spirals being of different length, wherein the partial spiral located adjacent said one end being the longest and the partial spiral located adjacent said other end being the shortest, the longest of said partial spirals extending over a peripheral angle of at least 180° and the shortest extending over a peripheral angle of at least 90°, each of said partial spirals having a terminal end axially remote from said inlet opening and located at a substantially uniform radial distance from said axis.

2. A separator according to claim 1 wherein said gas outlet opening is circular and wherein said spirals terminal end are positioned such that said uniform distance corresponds substantially to the radius of said gas outlet opening.

3. A separator according to claim 1 wherein each of said partial spirals is of substantially uniform height.

4. A separator according to claim 1 wherein said longest partial spiral extends over a peripheral angle of between about 180° and 360°.

5. A separator according to claim 1 wherein the shortest partial spiral extends over a peripheral angle of between about 90° and 180°.

6. A separator according to claim 1 wherein the shortest partial spiral extends over a peripheral angle of between about 135° and 180°.

7. A separator according to claim 1 wherein there are three of said partial spirals, wherein the partial spiral between the longest and shortest partial spirals has a peripheral length shorter than that of the longest partial spiral, but longer than that of the shortest partial spiral.

8. A separator according to claim 1 including a dip pipe extending into said housing through said gas outlet opening.

* * * * *